: US010915874B2

United States Patent
Code et al.

(10) Patent No.: US 10,915,874 B2
(45) Date of Patent: Feb. 9, 2021

(54) SYSTEM AND PROCESS FOR TOKENIZATION OF DIGITAL MEDIA

(71) Applicant: LOYYAL CORPORATION, New York, NY (US)

(72) Inventors: Shannon Code, Raleigh, NC (US); Sean Dennis, Earnley (GB); Gregory Simon, Beaufort, NC (US)

(73) Assignee: Loyyal Corporation, New York, NY (US)

( * ) Notice: Subject to any disclaimer, the term of this patent is extended or adjusted under 35 U.S.C. 154(b) by 357 days.

(21) Appl. No.: 15/402,209

(22) Filed: Jan. 9, 2017

(65) Prior Publication Data

US 2017/0214522 A1  Jul. 27, 2017

Related U.S. Application Data

(60) Provisional application No. 62/253,675, filed on Nov. 10, 2015.

(51) Int. Cl.
*H04L 29/06* (2006.01)
*G06Q 20/06* (2012.01)
(Continued)

(52) U.S. Cl.
CPC ........ *G06Q 20/0658* (2013.01); *G06F 21/10* (2013.01); *G06F 21/64* (2013.01); *G06Q 20/1235* (2013.01); *G06Q 20/3672* (2013.01); *H04L 9/0891* (2013.01); *H04L 9/3236* (2013.01); *H04L 9/3247* (2013.01); *H04L 63/0861* (2013.01); *H04L 63/10* (2013.01);
*G06F 2221/0775* (2013.01); *G06F 2221/0793* (2013.01); *G06Q 2220/00* (2013.01);
(Continued)

(58) Field of Classification Search
CPC .......... G06Q 20/0658; G06Q 20/1235; G06Q 20/3672; G06Q 2220/00; H04L 9/0891; H04L 9/3236; H04L 63/10; H04L 63/0861; H04L 9/3247; H04L 2209/38; H04L 2209/60; H04L 2463/103; G06F 2221/0793; G06F 2221/0775; G06F 21/64; G06F 21/10
See application file for complete search history.

(56) References Cited

U.S. PATENT DOCUMENTS

2015/0120567 A1* 4/2015 Van Rooyen ...... G06Q 20/3829
 705/59
2016/0344550 A1* 11/2016 Anton ..................... G06F 21/31
(Continued)

*Primary Examiner* — Michael R Vaughan
(74) *Attorney, Agent, or Firm* — Goodwin Procter LLP

(57) ABSTRACT

A system and process for converting a digital media file into a digital token is disclosed. The embodiments modify a digital media file so that a set of rules are attached to the digital media file creating a digital token, which can be used to persist the digital media file through a network. In an exemplary embodiment, the network is a distributed ledger or blockchain based network that securely tracks distribution of the digital media file. The digital token may have a value added to it or value may intrinsically exist as the digital token is persisted through the network. The value associated with distribution of the digital media file may be used to reward the owner of the digital media file, distributors of the token, or as an incentive program for commercial transactions and non-commercial transactions.

16 Claims, 3 Drawing Sheets

(51) Int. Cl.
    *H04L 9/32*       (2006.01)
    *G06F 21/10*     (2013.01)
    *G06Q 20/36*    (2012.01)
    *G06F 21/64*     (2013.01)
    *G06Q 20/12*    (2012.01)
    *H04L 9/08*       (2006.01)

(52) U.S. Cl.
    CPC ...... *H04L 2209/38* (2013.01); *H04L 2209/60* (2013.01); *H04L 2463/103* (2013.01)

(56) References Cited

U.S. PATENT DOCUMENTS

| | | | |
|---|---|---|---|
| 2017/0098291 A1* | 4/2017 | Code | G06Q 40/02 |
| 2017/0116693 A1* | 4/2017 | Rae | G06F 21/64 |
| 2017/0134162 A1* | 5/2017 | Code | G06F 21/10 |
| 2017/0236143 A1* | 8/2017 | Code | G06Q 30/0226 705/14.27 |
| 2018/0089651 A9* | 3/2018 | Lund | G06F 21/00 |
| 2018/0158162 A1* | 6/2018 | Ramasamy | H04L 9/14 |
| 2018/0173906 A1* | 6/2018 | Rodriguez | G06Q 20/363 |
| 2018/0293573 A1* | 10/2018 | Ortiz | G06Q 20/3821 |
| 2019/0005469 A1* | 1/2019 | Dhupkar | G06Q 20/06 |
| 2019/0007381 A1* | 1/2019 | Isaacson | G07G 1/0036 |

\* cited by examiner

SYSTEM AND PROCESS FOR TOKENIZATION OF DIGITAL MEDIA

CROSS-REFERENCE TO RELATED APPLICATION

This application claims benefit under 35 U.S.C. § 119(e) of U.S. Provisional Application having Ser. No. 62/253,675 filed Nov. 10, 2015, which is hereby incorporated by reference herein in its entirety.

FIELD

The subject disclosure relates to digital file management, and more particularly to a system and process for tokenization of media files within a network.

BACKGROUND

Currently digital media files are usually not securely exchanged or shared between two parties across a network environment. Examples of digital media files may include for example, movies, music, books or images. Additionally, the utility of digital media files are restricted to their function. Thus, the value of a digital media file is limited to the content of the file itself. The creator or owner of the digital media is therefore limited in capacity to monetizing a file.

As can be seen, there is a need for a system and process that can modify media files to add value to their structure.

SUMMARY

In one aspect of the disclosure, system for tokenization of digital media comprises a digital token configured for persisted distribution within an electronic distributed ledger, the digital token including: a digital media file, a set of stored rules attached to the digital media file, the set of stored rules including a distributed ledger protocol and conditions that define a change in status associated with the digital media file as the digital token is distributed within the electronic distributed ledger, and a host server configured to update the status of the digital token within the distributed ledger in response to a detected change in status of the digital token and broadcast an update of the digital token to the electronic distributed ledger.

In another aspect of the disclosure, method for distributing a digital media file within an electronic distributed ledger comprises generating a digital token associated with the digital media file, comprising a set of stored rules attached to the digital media file, the set of stored rules including a distributed ledger protocol and conditions that define a change in status associated with the digital media file as the digital token is distributed within the electronic distributed ledger; distributing, by a computer processor, the digital token within the electronic distributed ledger; identifying, by a computer processor, an update to a status of the digital media file within the electronic distributed ledger; modifying, by the computer processor, the status of the digital token in response to the identified updated status of the digital media file; and broadcasting by a host server, to the electronic distributed ledger, the modified status of the digital token.

In still yet another aspect of the disclosure a computer program product for hosting an online portal for the tokenization of a digital media file, comprises a non-transitory computer readable storage medium having computer readable program code embodied therewith, the computer readable program code being configured to: generate a digital token associated with the digital media file, comprising a set of stored rules attached to the digital media file, the set of stored rules including a distributed ledger protocol and conditions that define a change in status associated with the digital media file as the digital token is distributed within the electronic distributed ledger; distribute, by a computer processor, the digital token within the electronic distributed ledger; identify, by a computer processor, an update to a status of the digital media file within the electronic distributed ledger; modify, by the computer processor, the status of the digital token in response to the identified updated status of the digital media file; and broadcast by a host server, to the electronic distributed ledger, the modified status of the digital token.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

DETAILED DESCRIPTION

Figure 1:
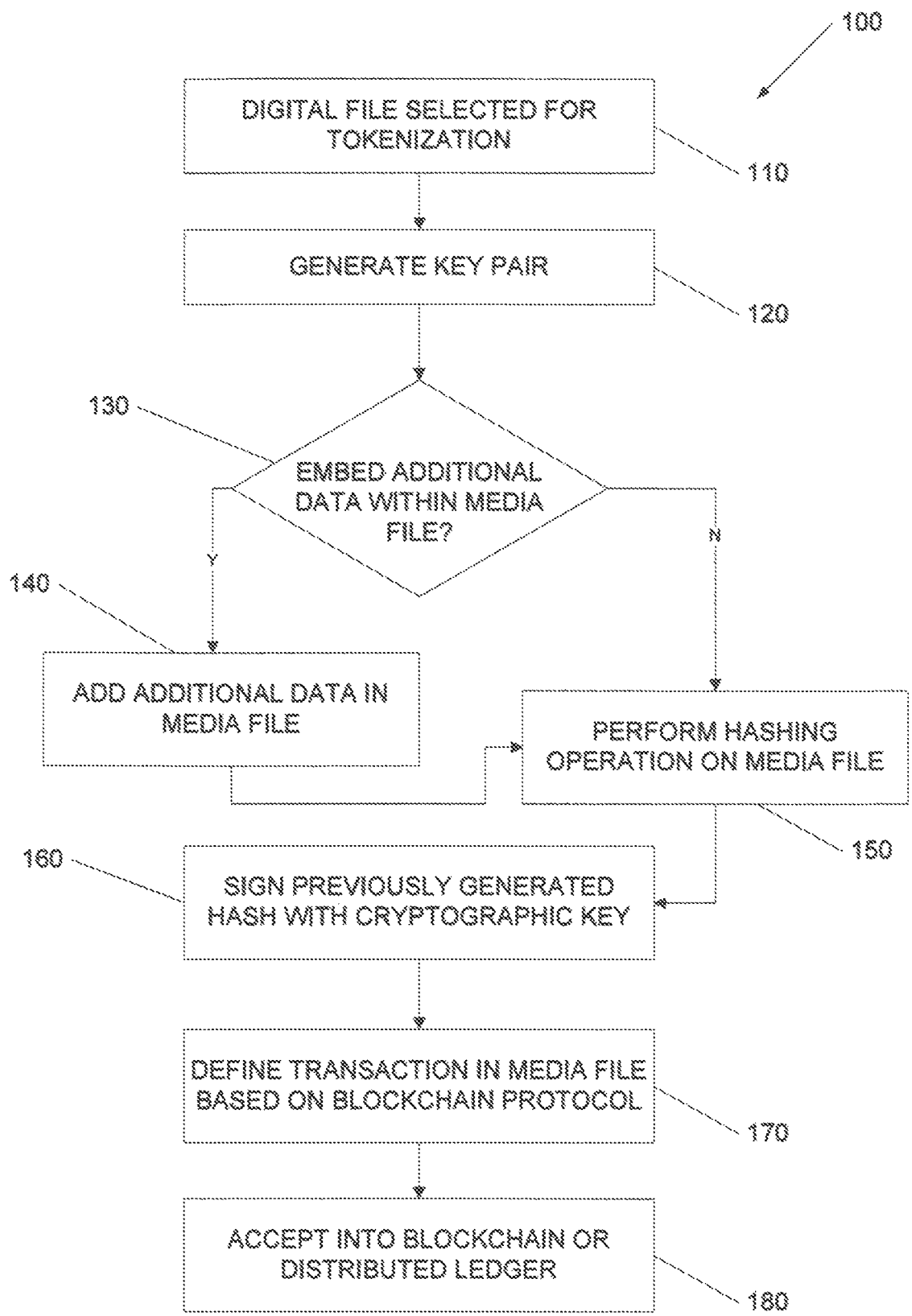
FIG. 1 is a flowchart of a method of tokenizing a digital media file for distribution in a blockchain or distributed ledger network in accordance with an aspect of the subject technology.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent to those skilled in the art that the subject technology may be practiced without these specific details. Like or similar components are labeled with identical element numbers for ease of understanding.

Generally, embodiments of the subject technology provide a system and process for modifying a digital media file, adding a layer of security to the modified media file, and adding value to the modified file for distribution within an electronic network. Embodiments disclosed below generally exist within an electronic online environment. In an exemplary embodiment, a digital media file is converted into a digital token. The digital token may be a string of bytes that define a set of rules or instructions associated with the base media file. The tokenized media file may be cryptographically secured to facilitate exchange between two parties. In an exemplary embodiment, the digital token includes computer executable instructions that change the string of bytes from one state to another upon a condition in the instructions being fulfilled as the tokenized digital media file persists (is distributed or transferred) through a blockchain or distributed ledger network. A distributed ledger protocol used herein may be for example a blockchain protocol such as, Bitcoin, Ethereum, Ripple, a permissioned distributed ledger, a metadata protocol on top of a distributed ledger protocol, such as CounterParty or ColoredCoins, or any other derivation of metadata protocols or distributed ledger protocols. The distributed ledger protocol may incorporate the use of smart contracts in the systems, which are evolving files whose status changes as conditions/rules are fulfilled during the existence of the digital media file within the system. In exemplary applications, the tokenized media file may have tangible value that can appreciate/depreciate under a smart contract. The token and its contents may be configured to remain static or self-modify based on criteria within the rules being met. In some embodiments, the token can reside within a ledger independently from the digital media file. A token may be used to facilitate transfer between parties and when decoupled from the actual media file acts as a reference to the media file. This allows easy transfer of rights that is not dependent on how the actual media file is being transferred from person to person. As might be appreciated, a tokenized media file might never actually move from one location to the next. But the tokenized representation of the media file which might represent distribution rights can be transferred quickly and easily many times.

It will also be appreciated that aspects of the subject technology improve the fields of digital file management, distribution of digital files, and sales of digital files. For example, an embodiment of the subject technology provides a system for transferring digital media files among the consuming public. Aspects disclosed herein manage the secure distribution of tokenized media files so that the contents of the token may be automatically adjusted and ensure integrity in the system by broadcasting the updated token through an electronic public ledger. As will be appreciated, value may be added to tokenized digital media files of the disclosed systems and processes by way of providing trackable performance. The performance may be translated into verifiable sales and can be used to create and track incentives for distributers of a tokenized digital media file.

Referring now to FIG. 1, a process 100 for tokenizing a digital media file for distribution in a blockchain or distributed ledger network is shown according to an exemplary embodiment. A digital media file may be selected 110 for tokenization. The digital media file may be for example a music file, a video file, a document, or other digital product. In some embodiments, multiple digital media files may be combined into one digital token. For example, an album of multiple digital sound tracks can be combined into one tokenized digital media file. The files may have the ability of separating from each other into multiple new digital tokens depending on the rules of the token.

The method may include generating 120 a cryptographic key pair for the digital media file being tokenized. The key pair may comprise a public key/private key pair that is used to access the token within the distributed ledger. Private keys are typically not transferred amongst parties. A wallet in a distributed ledger uses a string of hex that is derived from a user's public key. Rather than a location used to store assets or tokens, the system may specify which private keys have the right to interact with a particular ledger component. Transfer of a token from user A to user B may use a request and it is digitally signed by a user' private key. The request may consist of user A's public key, token information such as which token and the amounts to transfer, a recipient's wallet address. The ledger that receives the transaction is able to verify using the signature and a public key that the creator of the transaction was allowed to perform such a transfer because the network can derive the address from the provided transaction and verify that the address has the correct token balance available to transfer. Once the transaction is accepted into the system, user B whose address was specified in the transaction now has rights to transfer the amount of the token and that user A specified.

The need to share private keys is removed from the system and replaced by users granting rights or transferring rights to other users through this use of public key private key and address. Ledger protocols may vary, with different cryptographic rules, different signatures schemes, different algorithms, and different system state consensus models being used.

The system may determine 130 whether additional data should be embedded with the media file being tokenized. Depending on the originator of the digital token, a number of various types of data may be associated with a digital media file. For example, metadata associated with the digital media file may indicate a source of the digital media file, licenses associated with the digital media file, and terms of use. The additional embedded data may be set up to provide various applications. For example, a loyalty rewards program can be created by configuring the additional data to outline terms and rules for establishing credits for distribution and use of the digital media file within the system. The digital token may be embedded with units of tokenized value. The units of tokenized value may be a native blockchain token digital loyalty token, native blockchain token digital currency token such as Bitcoin or any other native blockchain digital loyalty token or currency token, a native permissioned distributed ledger token, a metadata protocol token or digital loyalty token or currency token on top of a distributed ledger protocol, such as Counterparty or ColoredCoins, or any other derivation of metadata protocols or distributed ledger protocols.

As will be appreciated, the units of tokenized value embedded with the tokenized digital media file may function as a reward to incentivize transactional commerce. For example, a customer who buys a digital video file may receive the digital media file embedded with additional tokens as a reward for the purchase. The customer can redeem the rewards for other goods or services, separate the reward to keep or sell, and/or sell the rewards embedded with the digital video file to another party. Smart contracts may or may not be involved.

In another embodiment, the additional units of tokenized value embedded with the tokenized digital media file may function as a royalty or an exchange fee source of funds. For example, a customer who buys a digital video file may receive the file embedded with additional tokens as a reward for the purchase. The customer later decides it wants to sell the digital media file to another party. When the file is sold to another party, a portion of the embedded units of tokenized value may be used as a royalty or exchange fee paid to another third party. The third party may or may not be the original creator of the content or the legal owner of the rights to the digital media. The royalty or exchange fee may or may not be automatically transferred from the seller of the digital media file to the third party.

In another embodiment, the additional units of tokenized value embedded with the tokenized digital media file may function as a reward to incentivize non-transactional commerce. For example, each time the owner of the tokenized digital media file plays a video file, some amount of reward (which may be in the form of a digital loyalty token or currency token) may be sent from a third party (which may or may not be the digital media creator or owner of the digital media rights) to the owner of the tokenized digital media file as an incentive to play the digital media. In another embodiment, an employer who wants to incentivize employees for healthier behavior uses aspects of the digital token to improve the lives of the employees and/or reduce health care costs. Upon confirmation an employee is performing some targeted behavior (such as jogging for an hour), the employer may transfer the tokenized digital media to the employee as a reward for the behavior.

After embedding 140 additional data with the media file (or on the absence of adding data), a hashing operation may be performed 150 on the digital media file. The hashing function may track attributes of the digital media file as it persists through the distributed ledger. For example, number of uses, number of transfers, and chains of transfer (for example tracing a chain of parties distributing the tokenized media file to an end party within the network).

The hashed tokenized digital media file may be cryptographically secured 160 on a distributed ledger protocol with a unique digital signature. The digital signature will notify the network of its authenticity preventing the ability to copy or counterfeit the tokenized digital media file. Any counterfeit or copied version will not have the authenticating digital signature and is rejected by the network.

The transaction(s) associated with the tokenized digital media file within the system may be defined 170 based on the protocol used in the network in which it is distributed. For example, in a blockchain environment, a block chain protocol is used. However, other protocols may be used as appropriate depending on the nature of the network. In some embodiments, the tokenized digital media file includes a hash chain function to verify the authenticity of a transferred tokenized digital media file within the system. The hash chain may be used to facilitate the purchase, borrow, rent or lease of specific parts of the media file as opposed to the entire file. Using the hash chain, the exact number of digital media file frames purchased, borrowed, rented or leased may be verified. A royalty payment may be made using a distributed ledger protocol token as a digital loyalty token or digital currency token, etc. either manually or autonomously.

In embodiments using a hash chain, the tokenized digital media content may be accessed as a blockchain, with each frame representing a block. The blockchain can be navigated using a blockchain explorer to find specific blocks of content or blocks of blocks of content. Users with access can leave comments tagged to that specific block or block of block content. The comment may be visible to other users, the creator of the digital media content or owner of the digital media rights. A user may send payment in the form of, including but not limited to, a tip, a royalty or a purchase payment, to the original content creator, the owner of the digital media rights, or any other third party directly by sending a token of value, which may be blockchain based, directly to an electronic wallet attached to the block or block of blocks.

The hash chain may allow the original creator or owner of the digital media rights to receive detailed data on the ownership and playback of the tokenized digital media content. For example, a user owns a movie file. The owner watches the first 30% of the movie twice without finishing it. Using the hash chain data of the exact frames viewed as blocks in the hash chain blockchain playback data can be transmitted to the original creator or owner of the digital media rights, along with other data including, but not limited to, date and time of playback, physical location during playback and the device it was accessed on.

The value embedded within the tokenized digital media file may be used as a royalty payment to the original content creator or owner of the digital media rights for frequency of times accessing the digital media content. For example, a user wishes to rent a song to be played only four times over an undetermined time. The tokenized digital media file may autonomously transfer the embedded value to the original content creator or the owner of the digital media rights as each frame is played or the entire file is played. When the embedded value has all been transferred, the file is no longer accessible.

Once the transaction for the token is defined, the tokenized digital media file may be accepted 180 into the network based on the rules for the network. An exemplary embodiment for accepting a tokenized digital media file is described in FIG. 2.

Figure 2:
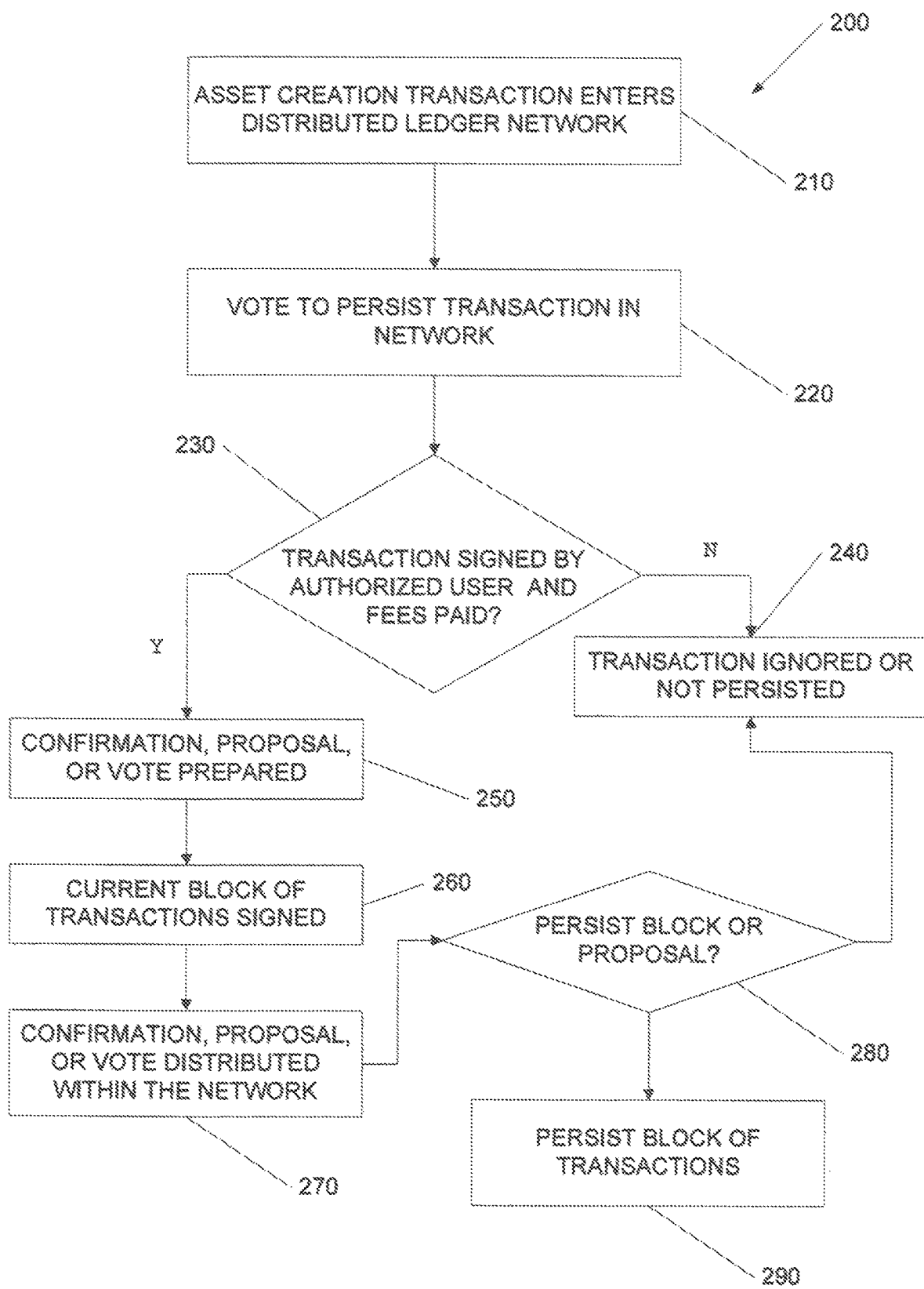
FIG. 2 is a flowchart of a method of persisting a tokenized digital media file in in a blockchain or distributed ledger network in accordance with an aspect of the subject technology.

Referring now to FIG. 2, a method 200 of persisting a tokenized digital media file in in a blockchain or distributed ledger network is shown according to an exemplary embodiment. The method 200 may begin by entering 210 the asset (the tokenized digital media file) into the network. Based upon the network's protocol, some or all of the network members propose or vote 220 to persist the transaction associated with the tokenized digital media file into the network. A determination 230 may be performed as to whether the transaction entering the network was signed by an authorized member of the network to perform asset creation and in some instances, whether fees were paid accordingly. If the determination is negative, the transaction (digital token) may be ignored or blocked from persisting through the network. Otherwise, a confirmation, proposal, or vote may be prepared 250. One or more participants within the network may sign off 260 on the current block of transactions up for vote which includes the tokenized digital media file. The conformation, proposal, or vote may be distributed 270 to members in the network. A determination 280 is made whether enough votes are in favor of persisting the tokenized digital media file into the network. A positive determination persists 290 the tokenized digital media file (and any other transaction voted on) into the network. Otherwise, the file and/or any other transactions may be blocked 240 from persisting.

It will be further appreciated that the embodiments described above are generally flexible and may be used for various applications. For example, the tokenized digital media may be used in general as an incentive for transactional commerce. For example, a customer buys a television from an online merchant. Upon confirmation of the transactional payment the tokenized digital media can be transferred to a user profile or electronic wallet as a reward for the transaction. The tokenized digital media may be exchanged on a network among user profiles or wallets. The profiles may be registered and verified with user information such as legal name, telephone number, credit card, etc. The original creator of the tokenized digital media may restrict exchange between users based on user specific information. User data may be accessible by the original creator or owner of the digital media rights.

Figure 3:
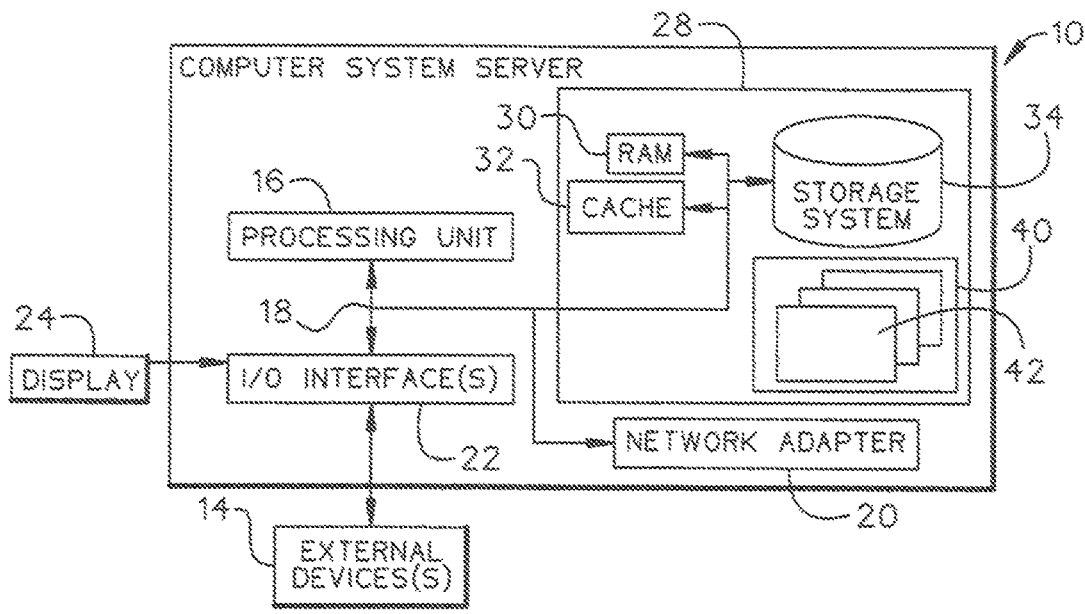
FIG. 3 is a block diagram of a computer/server system for processing and managing liabilities in accordance with an aspect of the subject technology.

Referring now to FIG. 3, a schematic of an example of a computer system/server 10 is shown. The computer system/server 10 is shown in the form of a general-purpose computing device. As may be appreciated, reference to a computer system/server 10 (sometimes referred to as a "general computing machine") in the following description may refer to different machines depending on the role or function being performed. In addition, more than one computer system/server 10 may be present simultaneously, for example in the network 100 described more fully below. The computer system/server 10 may serve the role as the machine implementing for example functions related to receiving and storing digital token terms, generating a token associated with a digital media file(s), performing contract terms, updating terms as a digital token persists through a network, tracking changes/status in a digital token, tracking a number of times a digital media file in a token has been used, accessed, or transferred, assessing a value for the token, generating a token value based on the terms of a token's rules, and persisting a digital token through a network. The components of the computer system/server 10 may include, but are not limited to, one or more processors or processing units 16, a system memory 28, and a bus 18 that couples various system components including the system memory 28 to the processor 16.

The computer system/server 10 may be for example, personal computer systems, tablet devices, mobile telephone devices, server computer systems, handheld or laptop devices, multiprocessor systems, microprocessor-based systems, set top boxes, programmable consumer electronics, network PCs, and distributed cloud computing environments that include any of the above systems or devices, and the like. The computer system/server 10 may be described in the general context of computer system executable instructions, such as program modules, being executed by a computer system (described for example, below). In some embodiments, the computer system/server 10 may be a cloud computing node connected to a cloud computing network (not shown). The computer system/server 10 may be practiced in distributed cloud computing environments where tasks are performed by remote processing devices that are linked through a communications network. In a distributed cloud-computing environment, program modules may be located in both local and remote computer system storage media including memory storage devices.

The computer system/server 10 may typically include a variety of computer system readable media. Such media could be chosen from any available media that is accessible by the computer system/server 10, including non-transitory, volatile and non-volatile media, removable and non-removable media. The system memory 28 could include one or more computer system readable media in the form of volatile memory, such as a random access memory (RAM) 30 and/or a cache memory 32. By way of example only, a storage system 34 can be provided for reading from and writing to a non-removable, non-volatile magnetic media device typically called a "hard drive" (not shown). The system memory 28 may include at least one program product 40 having a set (e.g., at least one) of program modules 42 that are configured to carry out the functions of embodiments of the invention. The program product/utility 40, having a set (at least one) of program modules 42, may be stored in the system memory 28 by way of example, and not limitation, as well as an operating system, one or more application programs, other program modules, and program data. Each of the operating system, one or more application programs, other program modules, and program data or some combination thereof, may include an implementation of a networking environment. The program modules 42 generally carry out the functions and/or methodologies of embodiments of the invention as described herein.

The computer system/server 10 may also communicate with one or more external devices 14 such as a keyboard, a pointing device, a display 24, etc.; and/or any devices (e.g., network card, modem, etc.) that enable the computer system/server 10 to communicate with one or more other computing devices. Such communication can occur via Input/Output (I/O) interfaces 22. Alternatively, the computer system/server 10 can communicate with one or more networks such as a local area network (LAN), a general wide area network (WAN), and/or a public network (e.g., the Internet) via a network adapter 20. As depicted, the network adapter 20 may communicate with the other components of the computer system/server 10 via the bus 18.

As will be appreciated by one skilled in the art, aspects of the disclosed invention may be embodied as a system, method or process, or computer program product. Accordingly, aspects of the disclosed invention may take the form of an entirely hardware embodiment, an entirely software embodiment (including firmware, resident software, microcode, etc.) or an embodiment combining software and hardware aspects that may all generally be referred to herein as a "circuit," "module," or "system." Furthermore, aspects of the disclosed invention may take the form of a computer program product embodied in one or more computer readable media having computer readable program code embodied thereon.

Any combination of one or more computer readable media (for example, storage system 34) may be utilized. In the context of this disclosure, a computer readable storage medium may be any tangible or non-transitory medium that can contain, or store a program (for example, the program product 40) for use by or in connection with an instruction execution system, apparatus, or device. A computer readable storage medium may be, for example, but not limited to, an electronic, magnetic, optical, electromagnetic, infrared, or semiconductor system, apparatus, or device, or any suitable combination of the foregoing.

Aspects of the disclosed invention are described below with reference to block diagrams of methods, apparatus (systems) and computer program products according to embodiments of the invention. It will be understood that each block of the block diagrams, and combinations of blocks in the flowchart illustrations and/or block diagrams, can be implemented by computer program instructions. These computer program instructions may be provided to the processor 16 of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

Figure 4:
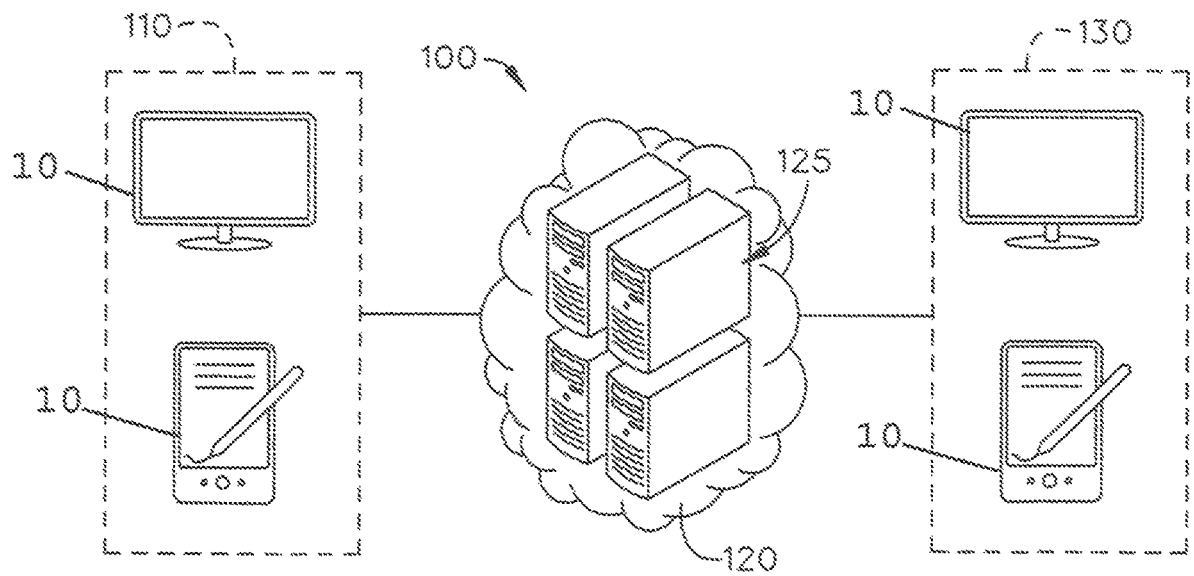
FIG. 4 is a block diagram of a network processing and managing liabilities in accordance with an aspect of the subject technology.

Referring now to FIG. 4, a system 100 generally includes a first party 110, a second party 130, and a network 120. The first and second parties 110; 130 may represent for example a distributing holder of a digital token with a digital media file and a second party receiving the digital token (or copy thereof). The network 120 may include a server(s) 125 storing a software embodiment of the disclosed invention and acting as an intermediary or host providing the distributed ledger or blockchain environment for implementing transactions within the system. The first party 110 and second party 130 may interact with the system 100 through respective general computing machines 10. The server(s) 125 likewise may function for example, under the description of the general computing machine 10. Changes to the token (or to the contract within the token) may be read, detected, and updated within the server(s) 125. In an exemplary embodiment, changes to the token may be tracked using a hash function (described above) stored and updated within the server(s) 125.

Those of skill in the art would appreciate that various components and blocks may be arranged differently (e.g., arranged in a different order, or partitioned in a different way) all without departing from the scope of the subject technology.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects. For example, while the foregoing was described in the context of a rewards or redemption program and associated liabilities, it will be understood that other applications may use aspects of the subject technology to track information and assess changing value as provided by the system and processes disclosed.

Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A system, comprising:
   a digital token configured for persisted distribution within an electronic distributed ledger, the digital token having a digital media file; metadata providing a source of the digital media file, a license associated with the digital media file, and terms of use of the digital media file; and a set of stored rules attached to the digital media file, the set of stored rules including a distributed ledger protocol and conditions that define a change in status associated with the digital media file as the digital token is distributed within the electronic distributed ledger; and
   a host server coupled to memory, configured to update the status of the digital token within the distributed ledger in response to a detected change in status of the digital token and broadcast an update of the digital token to the electronic distributed ledger, wherein the digital token is generated by converting the digital media file,
   the electronic distributed ledger having user profiles, wherein a first party and a second party are associated with respective user profiles verified by personally identifiable information including a legal name.

2. The system of claim 1, wherein the set of stored rules in the digital token indicate a change of status of the digital token in response to transfer or access to the digital media file from a first user profile in the electronic distributed ledger to a second user profile in the electronic distributed ledger.

3. The system of claim 1, wherein the set of stored rules in the digital token include a cryptographic hash function.

4. The system of claim 3, wherein the cryptographic hash function includes a public and private key pair.

5. The system of claim 1, wherein the change in status of the digital token includes a use of the digital media file.

6. The system of claim 1, wherein the change in status of the digital token includes a change in monetary value of the digital token.

7. A method, comprising:
   generating a digital token having a digital media file; metadata providing a source of the digital media file, a license associated with the digital media file, and terms of use of the digital media file; and a set of stored rules attached to the digital media file, the set of stored rules including a distributed ledger protocol and conditions that define a change in status associated with the digital media file as the digital token is distributed within the electronic distributed ledger, wherein generating comprises a conversion process by which at least a portion of the digital media file is converted and thus incorporated into the digital token associated with the digital media file;

distributing, by a computer processor, the digital token within the electronic distributed ledger;

identifying, by a computer processor, an update to a status of the digital media file within the electronic distributed ledger;

modifying, by the computer processor, the status of the digital token in response to the identified updated status of the digital media file; and broadcasting by a host server, to the electronic distributed ledger, the modified status of the digital token, the electronic distributed ledger having user profiles, wherein each respective user profile is verified by personally identifiable information including a legal name.

8. The method of claim 7, further comprising generating a cryptographic hash function associated with the digital token, the hash function tracking changes to the status of the digital media file.

9. The method of claim 8, wherein the hash function tracks the number of times the digital media file has been used or transferred between the user profiles in the electronic distributed ledger.

10. The method of claim 9, further comprising automatically changing a monetary value associated with the digital token based on the number of times the digital media file has been used or transferred between the user profiles in the electronic distributed ledger.

11. The method of claim 8, further comprising providing a monetary value associated with the digital token to parties distributing the digital token based on the number of times the digital media file has been used or transferred between the user profiles in the electronic distributed ledger.

12. A computer program product for hosting an online portal for the tokenization of a digital media file, the computer program product comprising a non-transitory computer readable storage medium having computer readable program code embodied therewith, the computer readable program code being configured, when executed by a computer processor, to:

generate a digital token having the digital media file; metadata providing a source of the digital media file, a license associated with the digital media file, and terms of use of the digital media file; and a set of stored rules attached to the digital media file, the set of stored rules including a distributed ledger protocol and conditions that define a change in status associated with the digital media file as the digital token is distributed within the electronic distributed ledger, wherein to generate comprises a conversion process by which at least a portion of the digital media file is converted and thus incorporated into the digital token associated with the digital media file;

distribute, by a computer processor, the digital token within the electronic distributed ledger;

identify, by a computer processor, an update to a status of the digital media file within the electronic distributed ledger;

modify, by the computer processor, the status of the digital token in response to the identified updated status of the digital media file; and broadcast by a host server, to the electronic distributed ledger, the modified status of the digital token, the electronic distributed ledger having user profiles, wherein each respective user profile is verified by personally identifiable information including a legal name.

13. The computer program product of claim 12, further comprising computer readable program code being configured to generate a cryptographic hash function associated with the digital token, the hash function tracking changes to the status of the digital media file.

14. The computer program product of claim 13, wherein the hash function tracks the number of times the digital media file has been used or transferred between the user profiles in the electronic distributed ledger.

15. The computer program product of claim 14, further comprising computer readable program code being configured to automatically changing a monetary value associated with the digital token based on the number of times the digital media file has been used or transferred between the user profiles in the electronic distributed ledger.

16. The computer program product of claim 12, further comprising computer readable program code being configured to providing a monetary value associated with the digital token to parties distributing the digital token based on the number of times the digital media file has been used or transferred between the user profiles in the electronic distributed ledger.

* * * * *